United States Patent [19]

Frank

[11] 4,378,784
[45] Apr. 5, 1983

[54] SOLAR HEATING SYSTEM
[75] Inventor: Arthur M. Frank, Plainview, N.Y.
[73] Assignee: Grumman Aerospace Corporation, Bethpage, N.Y.
[21] Appl. No.: 346,685
[22] Filed: Feb. 8, 1982

Related U.S. Application Data

[62] Division of Ser. No. 122,856, Feb. 20, 1982, Pat. No. 4,329,979, which is a division of Ser. No. 885,356, Mar. 13, 1976, abandoned.

[51] Int. Cl.³ .............................................. F24J 3/02
[52] U.S. Cl. .................................. 126/418; 126/437; 126/422; 417/394; 165/134 R
[58] Field of Search ............... 126/422, 437, 419, 418, 126/448, 442; 137/99; 417/394; 165/104.32, 134

[56] References Cited

U.S. PATENT DOCUMENTS

| | | | |
|---|---|---|---|
| 2,592,940 | 4/1952 | Monoyer | 417/397 |
| 2,970,546 | 2/1961 | White | 417/397 |
| 3,811,795 | 5/1974 | Olsen | 417/397 |
| 4,036,207 | 7/1977 | Bouse | 126/437 |
| 4,119,087 | 10/1978 | Cook | 126/422 |
| 4,210,125 | 7/1980 | Fender | 126/437 |
| 4,248,294 | 2/1981 | Budzynski | 126/437 |
| 4,309,982 | 1/1982 | Oquidam | 126/437 |
| 4,312,325 | 1/1982 | Voges | 126/442 |
| 4,345,715 | 8/1982 | Van Craenenbroeck | 165/104.32 |

Primary Examiner—Samuel Scott
Assistant Examiner—G. Anderson
Attorney, Agent, or Firm—Richard G. Geib

[57] ABSTRACT

A solar heating system for preheating water which may be used in conjunction with an existing hot water heater. The use of potable water as the heating fluid renders the use of a heat exchanger unit unnecessary. A novel collector unit is disclosed which includes a molded plastic collector frame with integral fluid passageway. The durable unitized collector design eliminates the need for frame members, additional fluid conduits, specially manufactured collector plates and multiple collector sealing layers. The invention provides an exceptionally low cost, material intensive solar heating system. Pumping systems are provided to facilitate collector operation in conjunction with high or low pressure preheating systems.

2 Claims, 10 Drawing Figures

SOLAR HEATING SYSTEM

This application is a division, of application Ser. No. 122,856, filed Feb. 20, 1982, now U.S. Pat. No. 4,329,979, a division of application Ser. No. 885,356 filed Mar. 13, 1976, now abandoned.

BACKGROUND OF THE INVENTION

There has been many previous solar collector systems described which provide energy savings particularly for meeting heating or hot water requirements. Although such systems have been known for some time, their implementation has been inhibited by the high cost of solar collector units and the relatively lower cost of common fossil fuels. With the cost of all fuels now escallating solar heating units have become more attractive, yet their usage is still restricted due in major part to the substantial initial expense involved in purchasing collector units.

Existing solar collectors tend to be either one of three types. Concentration type collectors localize the sun's light on a particular heat conductive member which transfers the heat to a circulating fluid which can then communicate the heat to a receptor. The labor and material expense involved in the manufacture of these focusing collectors make them impractical for many applications. In addition to the economic considerations typical concentration collectors are further limited in that they are effective for only a narrow angle of sunlight outside of which their effectiveness decreases dramatically.

Metallic pipe collectors typically include a black, fluid carrying pipe spaced between a glass or plastic cover and an insulated base. These devices often employ coiled piping or zigzagging in convolutions in a given plane requiring numerous flow restricting elbows and considerable lengths of metallic piping. Thermal inefficiencies result from the excessive spacing of the convolutions which permits radiation of much of the solar energy back into the atmosphere. Economic inefficiencies further include the excessive labor and material costs inherent in the production of the device.

The present invention is of the third variety utilizing a flat plate collector. This type system makes use of flat surfaces to absorb the solar energy, and can receive light from a wide variety of angles. Although a considerable number of flat plate collector systems exist none of these systems use the unitized mode of construction with integral fluid passageways as does the present invention. H. E. Stoutin U.S. Pat. No. 3,918,430 teaches a light weight plastic film solar collector utilizing a plate collector in a plastic frame. Stout however does not disclose the use of fluid passageways integral to the plastic frame but rather requires the installation of multiple film layers and further necessitates the use of a fabricated solar ply which makes the system more expensive. In addition the use of a plastic foam insulation base in the patent results in undesirable temperature limitations of which the inventors were apparently unaware. E. W. Gough in U.S. Pat. No. 3,076,450 teaches a plastic solar heater. This patent uses a polyurethane foam plastic base which includes an undulated top that defines a series of parallel water channels. The use of a now integral frame however necessitates additional fabrication and therefore additional cost. Furthermore the application of a black plastic liner to the surface of the plastic base requires additional manufacturing and results in direct contact between the heat conducting fluid and the thin plastic liner. If such contact is continuous the result is likely to be the deterioration of the plastic liner necessitating extensive repair procedures to the replacement of the entire unit.

In the present invention heat absorption is accomplished by an absorptive coating imposed on the upper surface of the collector plate. The coating may be selective or non-selective. This construction provides for simpler assembly a more evenly distributed coating, reduces deterioration of the absorptive coating, allows much simpler maintenance when necessary and allows for more direct solar exposure upon the absorptive coating resulting in a more efficient collection system. The present invention also allows for the application of a more even absorptive coating. The construction of the integral passageways used in the present invention further allows greater surface exposure of the heat conducting fluid. This eliminates the deep troughs found in Gough and results in an overall more efficient heat transfer to the conducting fluid. The heater disclosed by Gough is also limited in that the use of polyurethane foam plastic as a heat insulator makes the system unsuitable for use at the temperatures encountered in today's solar collector systems. In applications where the low pressure heater of Gough does prove effective the user is left unguided in the necessary task of developing a suitable low pressure collector loop system into which it must be integrated.

In U.S. Pat. No. 2,838,043 issued to R. W. Bliss a solar water heating system is described which utilizes a high pressure self-draining heating system with a coil type collector. While the automatic draining concept disclosed by Bliss was an improvement in contemporaneous systems, it remained to be seen if a low pressure system, requiring a less stringent construction, and therefore more cost effective, could be devised which could also be self-draining and utilize a less expensive unitized mode of construction.

Although the above described systems have assisted in solving problems present in the design of an efficient solar collector, neither these nor other systems proved entirely satisfactory for the reason that no truly cost effective low pressure collector system has been proposed until the emergence of the present system.

Accordingly it is an object of the present invention to provide a new and improved solar heating system which utilizes a low pressure collector loop and a simple inexpensive collector assembly.

It is another object of the present invention to provide a durable noncorrosive solar heating system which is not easily damaged, can be manufactured at low cost, and can utilize copper plumbing.

It is also an object of the present invention to provide a self-draining solar heating system requiring minimal maintenance and suitable for high temperature operation associated with shut down.

It is also an object of this invention to provide a system for adapting a low pressure solar heating system for use with either a high pressure or low pressure water heating system.

It is a further object of this invention to provide a solar collector system for preheating potable water which operates in conjunction with an existing hot water system so as to not to burden the hot water system during hours of little or no sunlight.

It is a still further object of this invention to provide a solar collector system which utilizes an inexpensive molded plastic collector base which makes fluid connection, installation, interconnection of multiple units and any necessary repair relatively simple and extremely cost effective in both terms of labor and materials.

These and other objects and advantages of the invention will be apparent from the following description and claims, the novelty consisting of the feature of construction, combination of parts, the unique relations of the members and the operation thereof, all as more completely outlined herein and particularly pointed out in the appended claims.

DETAILED DESCRIPTION

Figure 1:
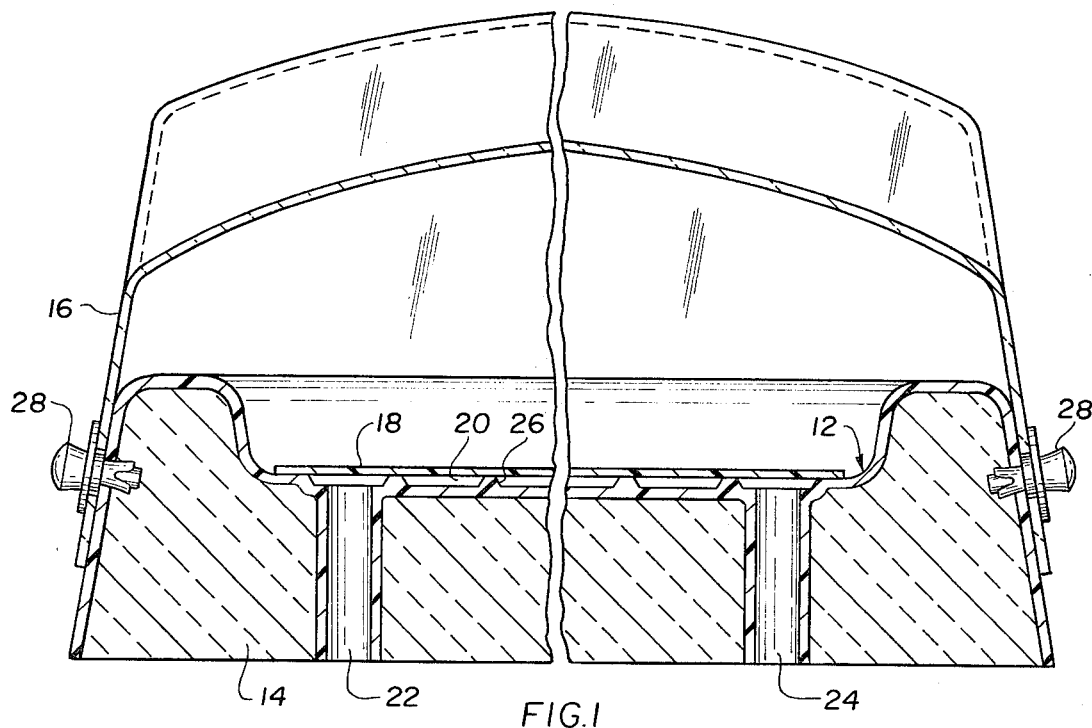
FIG. 1 is a fragmentary sectional view taken through the inlet and outlet port of a solar collector assembly constructed in accordance with the present invention showing details of the collector construction.

Referring now to the drawings in detail it will be seen that the embodiment of the invention which has been illustrated in FIG. 1 comprises molded plastic collector frame 12 of suitable dimensions having an interior cavity 14 with collector assembly cover 16 detachably mounted to the side walls of the collector assembly. Collector plate 18 is mounted on the surface of frame 12.

Collector frame is composed of material capable of withstanding high temperatures and includes a ribbed top surface portion defining a plurality of capillary water passages 20. Fluid inlet passageway 22 is designed to communicate the heating fluid to capillary passages 20 where it comes in contact with the lower surface of collector plate 18. Fluid discharge passageway 24 communicates the heating fluid from the collector assembly back into the heating system loop. Standoffs 27 provide for a manifold type effect permitting more even fluid flow distribution across capillary passages 20.

Frame 12 is backed with a high temperature insulating foam such as isocyanurate foam interposed in interior cavity 14. The insulating foam serves to keep the heating fluid at a higher temperature and therefore minimize heat losses associated with the assembly.

The sides of frame 12 are slightly angled to permit easy removal from the mold, stacking during manufacture and shipping, and to permit simple assembly between the frame 1 and collector assembly cover 16.

Figure 2:
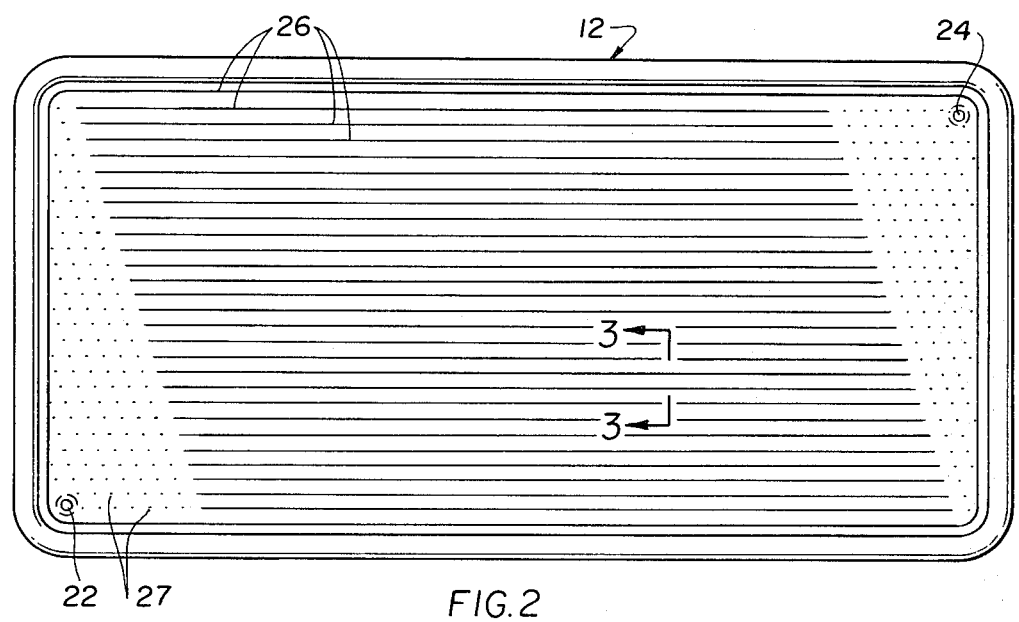
FIG. 2 is a front elevation view of the molded collector frame showing the ribbed upper surface.
Figure 3:
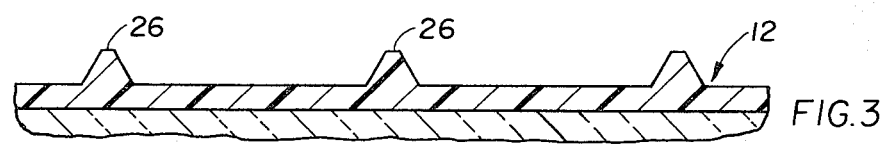
FIG. 3 is an enlarged sectional view taken along 3—3 of FIG. 2 showing details in the construction of the ribbed collector frame surface.

Ribs 26, shown in more detail in FIG. 2 and FIG. 3 serve a dual purpose of defining capillary passages 20 and supporting collector plate 18. The ribs are an integral portion of frame 12 being formed as to optimize flow distribution to provide maximum exposure of the heating fluid to the lower surface of plate 18 while consistent with cost intensive production. Ribs 26 are bonded to collector plate 18 to form a leakproof assembly therewith. Plate 18 is composed of a thin sheet of absorptive material which can be provided with a solar selective black coating on its upper surface to increase solar energy absorption.

Figure 4:
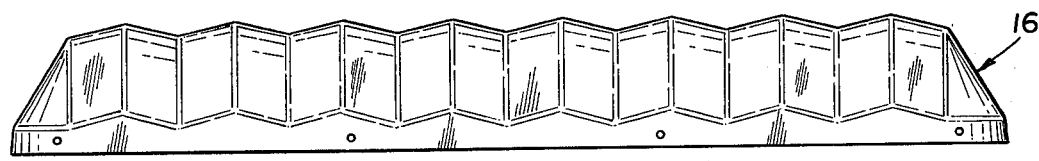
FIG. 4 is a view of a cross section of the collector assembly cover.
Figure 5:
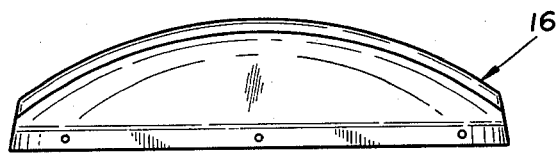
FIG. 5 is a side view in cross section of the collector assembly cover.
Figure 6:
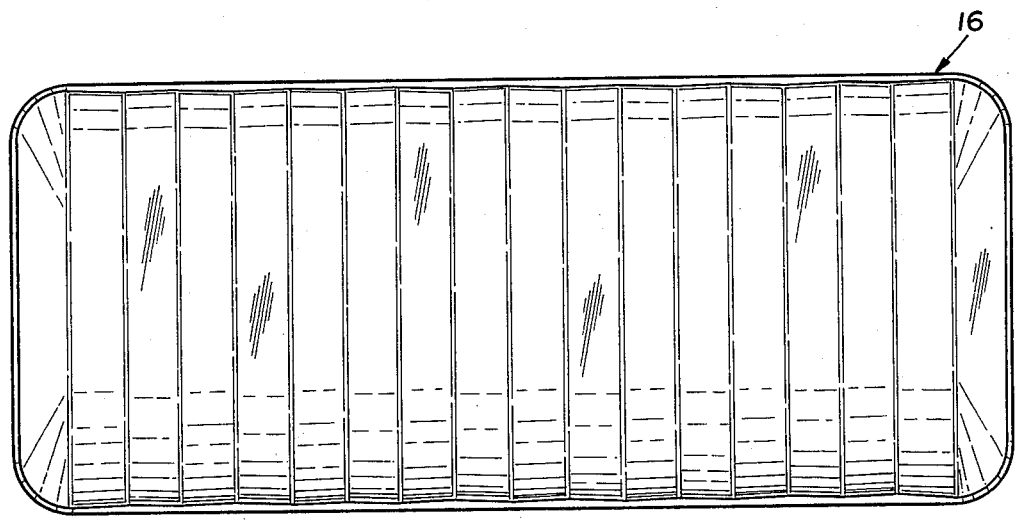
FIG. 6 is a top view of the collector assembly cover.

FIGS. 4, 5 and 6 show the construction of collector assembly cover 16 in detail. The cover is composed of a thin transparent molded plastic being crowned or ribbed to improve appearance and add the strength necessary to withstand the loads encountered in shipping, installation and operation. If desired, multiple covers of similar or differing designs may be used without departing from the spirit of the invention. The cover is shown attached to the frame in FIG. 1 utilizing fasteners 28 along the sides.

Figure 7:
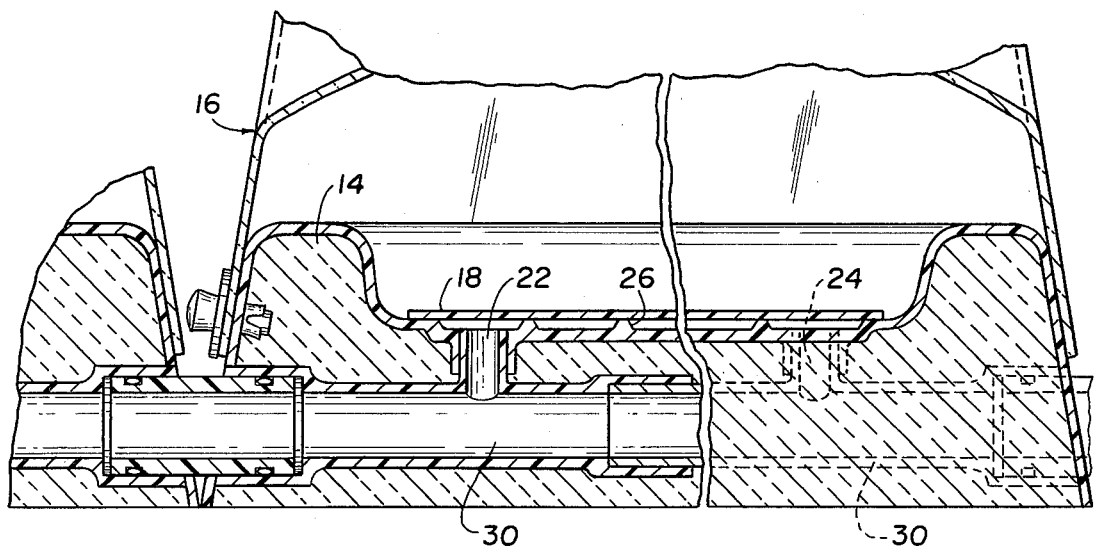
FIG. 7 is a fragmentary sectional view of an alternative embodiment of a solar collector assembly showing details of the assembly.

FIG. 7 illustrates an alternative construction of frame 12 incorporating integral manifolding 30 used in order to simplify installation of multiple collector assembly units.

Figure 8:
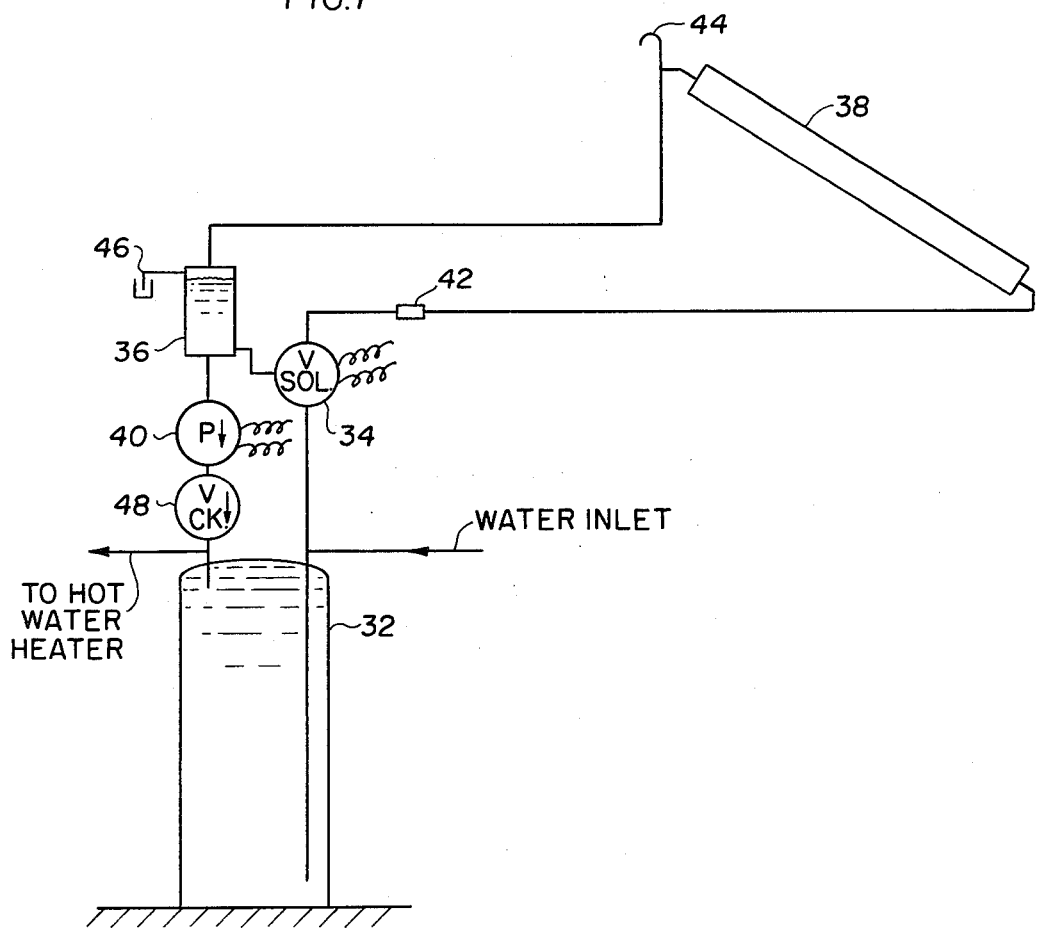
FIG. 8 is a schematic diagram of a solar heating system for a pressurized hot water supply constructed in accordance with the present invention.
Figure 9:
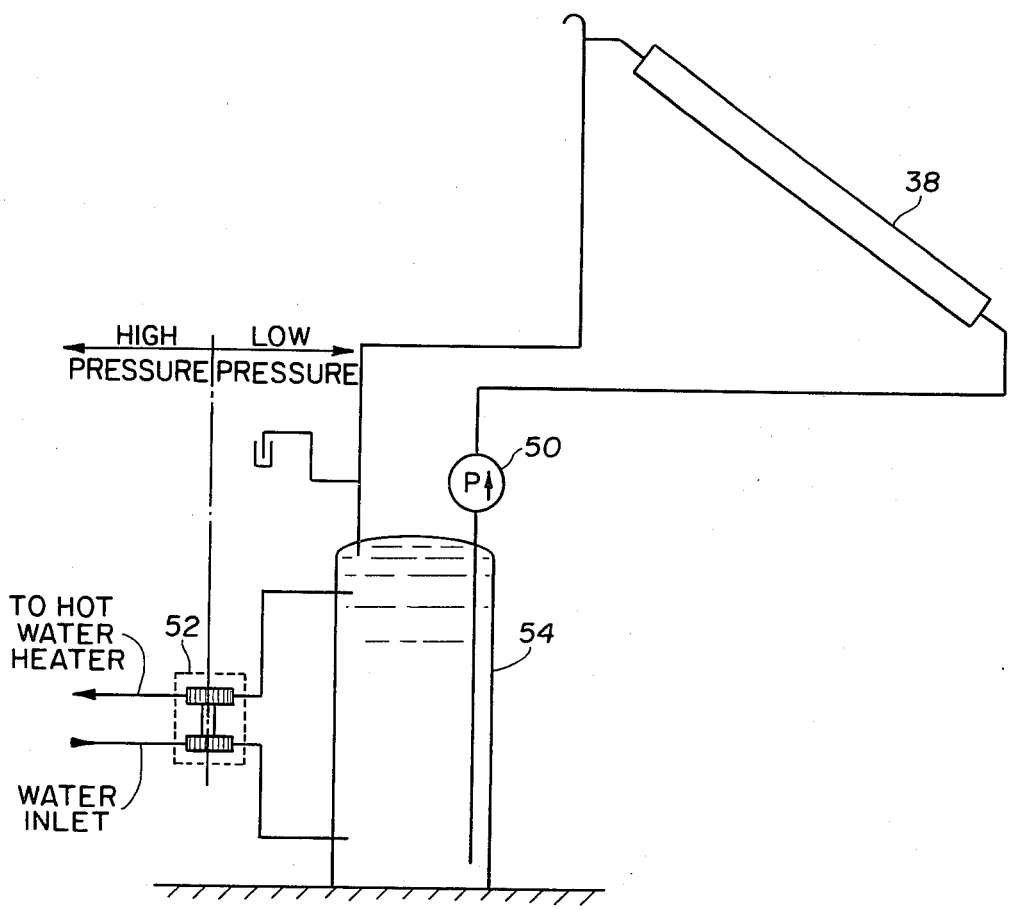
FIG. 9 is a schematic diagram of an alternative embodiment of the present invention illustrating the use of the same with a low pressure hot water preheater.

FIG. 8 and FIG. 9 are schematic representations of domestic hot water systems that permit the use of the low cost, low pressure solar collector previously described, in a highly efficient manner by eliminating the need for a heat exchanger between the high pressure water supply and the low pressure collector system. FIG. 9 depicts a system utilizing a pump to repressurize the water that has passed through the collector, back to system pressure.

Insulated preheater tank 32 is of standard commercial design providing pressurized hot water to an existing hot water heater. Three way solenoid valve 34 is operated by a temperature difference between the water in preheater 32 and in solar array 38. When the temperature of the solar array 38 exceeds the water temperature in preheater tank 32, valve 34 operates to allow the pressurized lower temperature water input to pass through the now open solenoid valve 34 and into the solar array at low pressure. Restricted orifice 42 serves to control the flow of water into the array.

The solar array 38 is positioned above the remainder of the system so that when water is not being pumped through the collector loop array 38 drains into small insulated tank 36. Pump 40 is activated by the water level in insulated tank 36 and operates to pump water from unpressurized insulated tank 36 into pressurized preheater tank 32 as the solar array drains. Vent 44 and drain 46 operate to facilitate this drainage by creating an air space in the upper portion of insulated tank 36. Check valve 48 operates to prevent the flow of water from the pressurized preheater into the collector loop.

FIG. 9 depicts a two pump hot water system where the preheater tank 54 operates at low pressure permitting a less expensive metal or even a plastic tank to be used. Pump 50 is utilized to pump water through the solar collector array 38 while pump 52 operates when usage demands hot water. Pump 52 does not have to be boosted since it can deliver water at slightly reduced pressure without the user being aware of the change.

Figure 10:
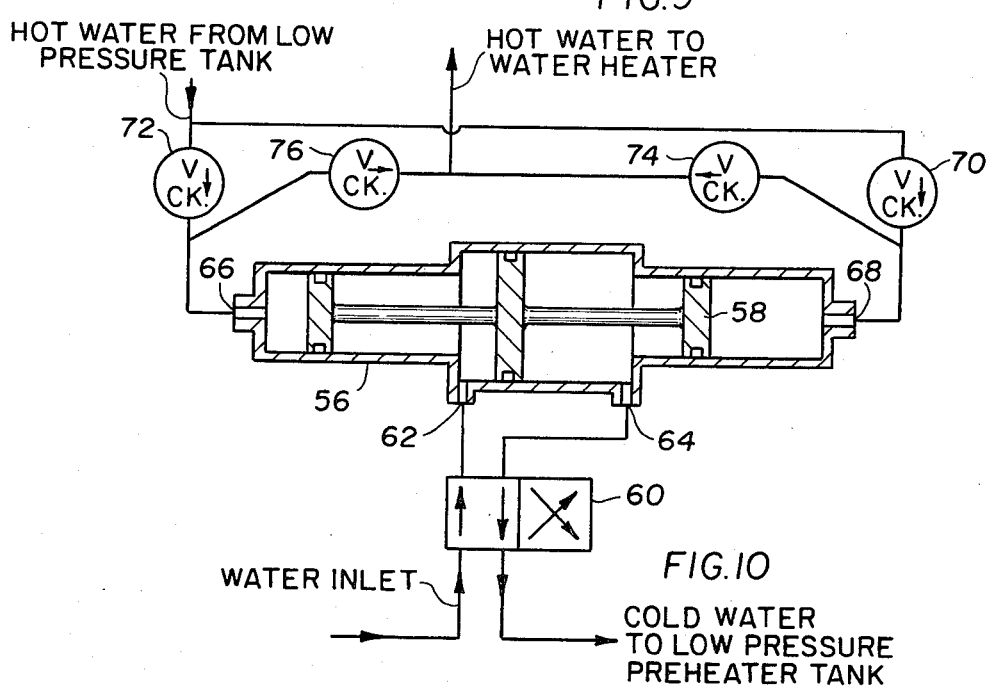
FIG. 10 is an illustration of a combination unboosted pressure reducer and unboosted pump assembly for use in the system of FIG. 9.

An unboosted pump assembly is illustrated in detail in FIG. 10. Inside pump body assembly 56 piston assembly 58 longitudinally traverses the assembly responsive to alternating input flows. Mechanical valve 60 acts as a logic valve channeling the cold water inputs to ports 62 and 64 alternatively depending upon the position of the piston. The cold water output leaves the pump assembly after logic valve 60 alternates the input through the same port it entered, now being reduced in pressure. Hot water from low pressure tank 54 enters the pump assembly through ports 66 and 68 alternatively. As the low pressure hot water enters one portion of the assembly it is being discharged from another portion, due to the motion of the piston assembly responding to the high pressure inputs through ports 62 and 64. The difference in the cross sectional area of compressed portions of the interior pump assembly results in increased discharge pressures in the smaller portions of the assembly. The hot water being discharged from the assembly is thereby pressurized to approximately the pressure of the cold water input and is directed from ports 66 and 68 towards a standard domestic hot water heater. Check valves 70, 72, 74 and 76 operate to insure that the low pressure hot water from the solar array does not intermix with the pressurized hot water flow to the external hot water heater.

It is to be understood however that a great number of variations may be made in the invention without departing from its spirit and scope. For example, the restricted orifice 42 and pump 46 can be replaced by a single combination pressure reducer and booster pump assembly interposed between the input and output conduits to preheater tank 32. Additional changes in size, shape or modules can also be utilized within the scope of the present invention.

Having described an operative construction for the invention it is now desired to set forth the intended protection sought by these Letters Patent in the appended claims that follow:

I claim:

1. A domestic solar hot water system having a pressurized water input and output comprising:
    means for reducing the input water pressure;
    an insulated low pressure preheater tank with an input in fluid communication with said pressure reducing means and an output discharge conduit leading from said preheater tank;
    a first pumping means between the system output and said preheater tank output for communicating water from said preheater tank to a pressurized external hot water heater when useage requires;
    an array of interconnected solar assembly units having input and output ports, both being connected to said preheater tank;
    a differential temperature controller connected between said solar array and said preheater tank, being adjustable to actuate when said array receives sufficient solar energy to heat the water therein to a temperature greater than that of the water in said preheater; and
    second pumping means connected to and actuated by said differential temperature controller to pump water from said preheater through said solar array.

2. The domestic hot water system as defined in claim 1 wherein said means for reducing the input pressure and said first pumping means for communicating water from said preheater tank to an external hot water heater comprise a single unit connected between the system input and output, said unit comprising:
    a pump body assembly having a hollow interior being characterized by three longitudinal compression chambers of equal length, with the middle chamber being wider than the end chambers;
    a piston assembly positioned within said assembly and having three piston heads, one of said heads positioned in each of said compression chambers forming watertight seals with the longitudinal walls of said chambers and in slidable communication therewith;
    a mechanical logic valve connected to said assembly wherein said pressurized system input is communicated to the input of said valve and the output of said valve is communicated to said low pressure preheater tank, said valve being sequenced by the position of said piston such that the system input is communicated through one of two apertures in said middle chamber so as to cause water under low pressure to be discharged from said assembly into said low pressure preheater tank;
    end chamber ducts imposed at the longitudinal ends of said pump body assembly, both of said ducts being connected to receive water from said low pressure preheater tank as said piston assembly moves away from said duct and dischargable into a pressurized hot water heater as said piston assembly moves toward said duct, and;
    check valve interposed in the input and output conduits as to assure the proper direction of waterflow therein.

* * * * *